(12) United States Patent
Noguchi

(10) Patent No.: US 7,617,944 B2
(45) Date of Patent: Nov. 17, 2009

(54) ELECTRONIC APPARATUS

(75) Inventor: Takayuki Noguchi, Saitama (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 11/348,491

(22) Filed: Feb. 7, 2006

(65) Prior Publication Data

US 2006/0188249 A1 Aug. 24, 2006

(30) Foreign Application Priority Data

Feb. 15, 2005 (JP) .......................... P2005-038248

(51) Int. Cl.
*B65D 51/18* (2006.01)
(52) U.S. Cl. .................................. 220/254.6
(58) Field of Classification Search .............. 220/254.6, 220/254.5, 254.3, 254.2, 254.1, 254.4, 826, 220/813, 812, 811, 827, 830, 817, 819, 820, 220/822, 823, 255, 606, 605, 810, 816, 259.2, 220/259.1, 256.1; 396/539, 538, 536, 535; *B65D 43/22; H05K 5/03*
See application file for complete search history.

(56) References Cited

U.S. PATENT DOCUMENTS

| | | | | | |
|---|---|---|---|---|---|
| 5,305,039 | A | * | 4/1994 | Dassero | 396/536 |
| 5,365,951 | A | * | 11/1994 | Arterbery et al. | 131/339 |
| 5,583,598 | A | * | 12/1996 | Kobayashi | 396/538 |
| 5,619,298 | A | * | 4/1997 | Stiehler | 396/388 |
| 5,666,575 | A | * | 9/1997 | Stephenson et al. | 396/284 |
| 5,887,207 | A | * | 3/1999 | Gasper et al. | 396/390 |
| 5,987,268 | A | * | 11/1999 | Takahashi et al. | 396/538 |
| 6,101,341 | A | * | 8/2000 | Manabe | 396/536 |
| 6,275,663 | B1 | * | 8/2001 | Taku | 396/538 |
| 6,542,701 | B2 | * | 4/2003 | Yokoyama et al. | 396/535 |
| 2003/0044183 | A1 | * | 3/2003 | Misawa | 396/539 |
| 2004/0214482 | A1 | * | 10/2004 | Ariga | 439/894 |
| 2004/0252991 | A1 | * | 12/2004 | Kawai et al. | 396/529 |

FOREIGN PATENT DOCUMENTS

| | | | | |
|---|---|---|---|---|
| JP | 01302240 | A | * | 12/1989 |
| JP | 02-082761 | | | 3/1990 |
| JP | 03226721 | A | * | 10/1991 |
| JP | 04151136 | A | * | 5/1992 |
| JP | 06-006744 | | | 1/1994 |
| JP | 06082978 | A | * | 3/1994 |
| JP | 06273834 | A | * | 9/1994 |
| JP | 11-355626 | | | 12/1999 |
| JP | 2000-019602 | | | 1/2000 |
| JP | 2003-158657 | | | 5/2003 |
| JP | 2003-257395 | | | 9/2003 |

* cited by examiner

*Primary Examiner*—Mickey Yu
*Assistant Examiner*—Robert J Hicks
(74) *Attorney, Agent, or Firm*—Oblon, Spivak, McClelland, Maier & Neustadt, L.L.P.

(57) ABSTRACT

An electronic apparatus is provided. The electronic apparatus includes an electronic apparatus body that includes a power source storage portion and an information storage medium storage portion. A lid is rotatably attached to the electronic apparatus body. The lid includes a first lid piece that is rotatably and slidably attached to the electronic apparatus body, a second lid piece that is rotatably attached to the first lid piece, and a lock mechanism configured to lock the first lid piece to the electronic apparatus body.

16 Claims, 11 Drawing Sheets

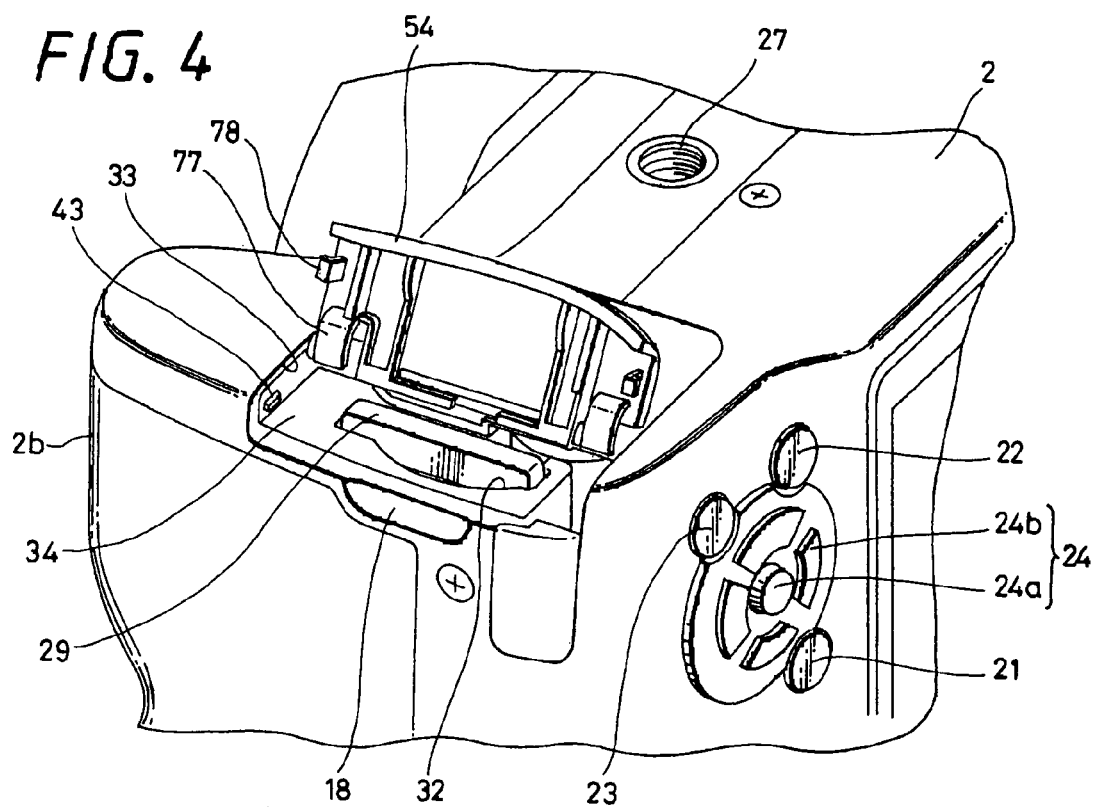
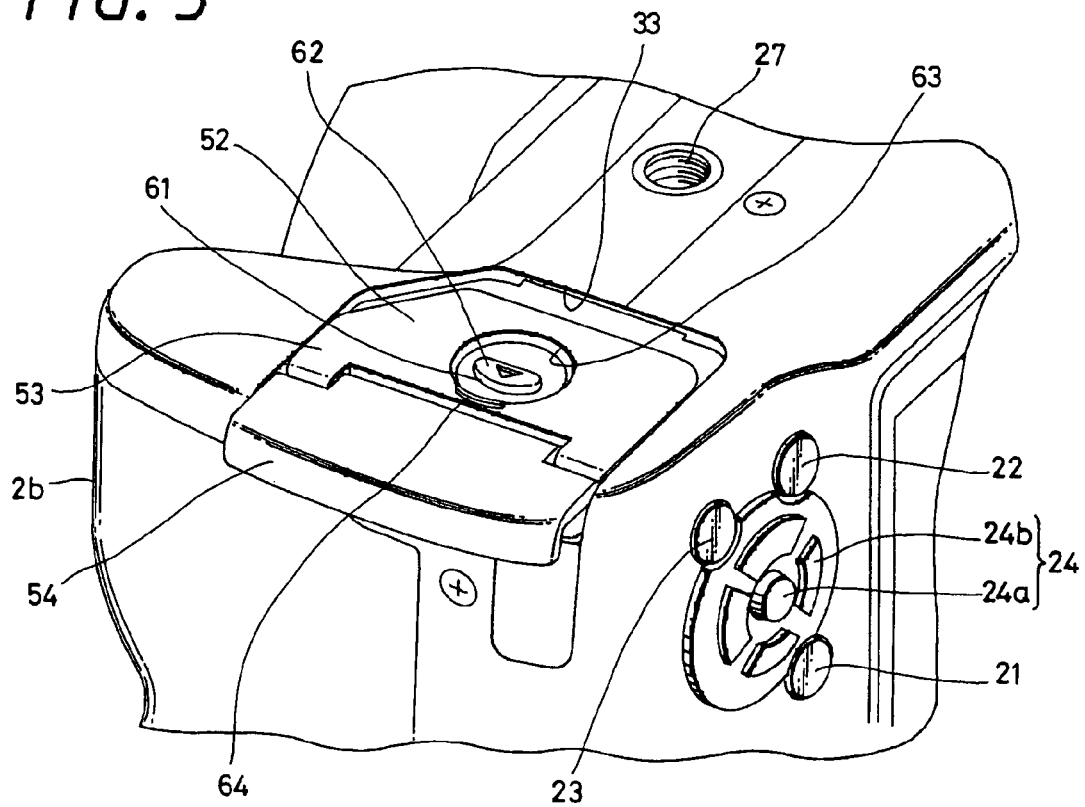

ELECTRONIC APPARATUS

CROSS REFERENCES TO RELATED APPLICATIONS

The present invention contains subject matter related to Japanese Patent Application JP 2005-38248 filed in the Japanese Patent Office on Feb. 15, 2005, the entire contents of which being incorporated herein by reference.

BACKGROUND OF THE INVENTION

1. Field of the Invention

The present invention relates to an electronic apparatus in which an electronic apparatus body includes a power source storing portion where a power source such as a dry battery or battery pack is stored and an information storage medium storing portion where an information storage medium such as a semiconductor storage medium or disk-like storage medium is stored, and those storing portions are opened and closed with one lid.

2. Description of the Related Art

As an electronic apparatus of this kind in related art, one written in Patent Literature 1 has been known, for example. Patent Literature 1 discloses a camera apparatus in which a card-like recording medium, what is called a memory card, is stored by a lid which opens and closes. The camera apparatus disclosed in Patent Literature 1 includes an electrically-driven lid locking/unlocking mechanism having: a lid portion which opens and closes an accommodating portion where a card-like recording medium and a battery are stored, with a hinge serving as a fulcrum; a knob portion capable of sliding movement for setting the lid portion at a lid unlocking position; a prodding piece provided in the knob portion; and an electromagnetic switch which faces the prodding piece and has a movable part electrically switched; in which while data is being recorded into the card-like recording medium, the lid portion is prevented from being opened with the prodding piece of the knob portion being held by the movable part of the electromagnetic switch, but while data is not being recorded into the card-like recording medium, the lid portion is opened with the movable part of the electromagnetic switch being withdrawn and thus the holding of the prodding piece of the knob portion being cancelled.

According to a camera apparatus of the above structure, such effectiveness as follows can be expected: while data such as a still image or moving image are being recorded into a card-like recording medium, a lid portion is not allowed to open and the recorded data can be protected, and further malfunction on the side of the camera body can be prevented.

However, in the camera apparatus described in the above Patent Literature 1, while data are being recorded, the lid portion is prevented from being opened by the electrically-driven lid locking/unlocking mechanism and so the recorded data are prevented from disappearing due to the cut of power supplied to the camera apparatus caused by opening the lid portion. However, when the lid portion is opened to attach/detach the card-like recording medium after the lid portion is unlocked, the power supplied to the camera apparatus is cut and so the camera apparatus needs to be turned on every time the lid portion is opened, which is troublesome for the user. Further, if the camera apparatus is again turned on after the card-like recording medium has been attached/detached, it takes time for the camera apparatus to start operating and so an opportunity to take a photograph could be missed.

Further, among typical electronic apparatuses, there is an electronic apparatus in which a power source storing portion and an information storage medium storing portion are opened and closed with separate lids to enable an information storage medium to be attached/detached without cutting power supplied to the electronic apparatus. However, there is a problem in which if a power source storing portion and an information storage medium storing portion are opened and closed by separate lids, the structure needs to be complicated in order for an electronic apparatus body to have predetermined strength, and the number of parts increases, causing high cost which is uneconomical. Further, it is difficult to efficiently use the space provided in the electronic apparatus body, and the electronic apparatus is therefore prevented from being small-sized as a whole.

[Patent Literature 1] Japanese Published patent Application No. 2002-354303

SUMMARY OF THE INVENTION

The present invention addresses the above-identified, and other problems associated with conventional methods and apparatuses, in which when a lid is opened to attach/detach the information storage medium in an electronic apparatus including a power source storing portion and an information storage medium storing portion that are opened and closed with one lid, the power supplied to the electronic apparatus is cut every time when opened, which is troublesome for the user; and also after the power is cut, it takes time for the camera apparatus to again start operating and so an opportunity to take a photograph could be missed.

An electronic apparatus according to an embodiment of the present application includes: an electronic apparatus body having a power source storing portion in which a power source is stored in a detachable manner and an information storage medium storing portion in which an information storage medium is stored in a detachable manner, and a lid attached in a turnable manner to the electronic apparatus body to open and close the power source storing portion and the information storage medium storing portion, in which the lid is formed by combining a first lid piece which faces the power source storing portion and a second lid piece which faces the information storage medium storing portion with a hinge, the first lid piece is supported in a turnable and slidable manner with respect to the electronic apparatus body, and lock means which lock the first lid piece are provided.

An electronic apparatus according to an embodiment of the present application is an electronic apparatus in which a power source storing portion is capable of storing a plurality of battery power sources, and conductive material which connects the plurality of battery power sources is provided on a first lid piece.

An electronic apparatus according to an embodiment of the present application is an electronic apparatus in which a cord-passing groove which passes outside an information storage medium storing portion, one end of which passes continuously to a power source storing portion, and the other end of which is bored in the outer surface is provided in an electronic apparatus body.

Further, an electronic apparatus according to an embodiment of the present application is an electronic apparatus in which a cam convex portion whose surface is shaped like a parabola or high-order curve is provided on a first lid piece or a second lid piece, and a resilient locking piece which slidably contacts, biased by the cam convex portion, is provided on the second lid piece or the first lid piece.

According to an embodiment of an electronic apparatus of the present application, a first lid piece which faces a power source storing portion and a second lid piece which faces an information storage medium storing portion are combined with a hinge to be one lid, the first lid piece is supported in a turnable and slidable manner with respect to an electronic apparatus body, lock means which lock the first lid piece are provided, and the second lid piece is joined to the first lid piece in a turnable manner, and so the whole lid can be slid and turned by unlocking the first lid piece, the power source storing portion and the information storage medium storing portion can be opened and closed together, and only the information storage medium storing portion can be opened by opening only the second lid piece. Therefore, an electronic apparatus in which an information storage medium can be attached/detached without opening a power source storing portion, in other words, without cutting power supplied to the electronic apparatus, can be obtained with a simple structure.

According to an embodiment of an electronic apparatus of the present application, since a plurality of battery power sources can be stored in a power source storing portion and conductive material which connects the plurality of battery power sources is provided on a first lid piece, power suitable for the electronic apparatus can be supplied using commercially available D dry batteries, C dry batteries or the like, and power sources can immediately be secured in an emergency.

According to an embodiment of an electronic apparatus of the present application, a cord-passing groove which passes outside an information storage medium storing portion, one end of which passes continuously to a power source storing portion, and the other end of which is bored in the outer surface is provided in an electronic apparatus body, and so power outside the electronic apparatus can be supplied to the electronic apparatus, that is, in the state in which a DC plate or the like is stored in the power source storing portion and the power source storing portion is closed with a lid, for example, a cord pulled out of the DC plate can be inserted in the cord-passing groove and power can therefore be supplied from outside the electronic apparatus to obtain an electronic apparatus with a simplified structure.

Further, according to an embodiment of an electronic apparatus of the present application, a cam convex portion whose surface is shaped like a parabola or high-order curve is provided on a first lid piece or a second lid piece, and a resilient locking piece which slidably contacts, biased by the cam convex portion, is provided on the second lid piece or the first lid piece, and so by means of frictional force generated between the resilient locking piece and the cam convex portion, there can be a flat state in which the first lid piece and the second lid piece make one flat surface, a folded state in which only the second lid piece has been opened, and a posture at any angle between these. Further, in the flat state the two lid pieces can be treated as one lid, and in the folded state an information storage medium can be attached/detached, so that an electronic apparatus which is excellent in operability can be provided.

BRIEF DESCRIPTION OF THE DRAWINGS

FIG. 4 is a perspective view showing a lid opening and closing device of the digital still camera shown in FIG. 1, in which a second lid piece is opened to open an information storage medium storing portion;

FIG. 5 is a perspective view showing a lid opening and closing device of the digital still camera shown in FIG. 1, in which a lid is slid;

DESCRIPTION OF THE PREFERRED EMBODIMENTS

A first lid piece which faces a power source storing portion and a second lid piece which faces an information storage medium storing portion are combined with a hinge to form one lid, the first lid piece is supported in a turnable and slidable manner with respect to an electronic apparatus body, and lock means which lock the first lid piece are provided, and therefore, an electronic apparatus capable of opening and closing a power source storing portion and an information storage medium storing portion together, and capable of opening and closing only the information storage medium storing portion is obtained with a simple structure.

Figure 1:
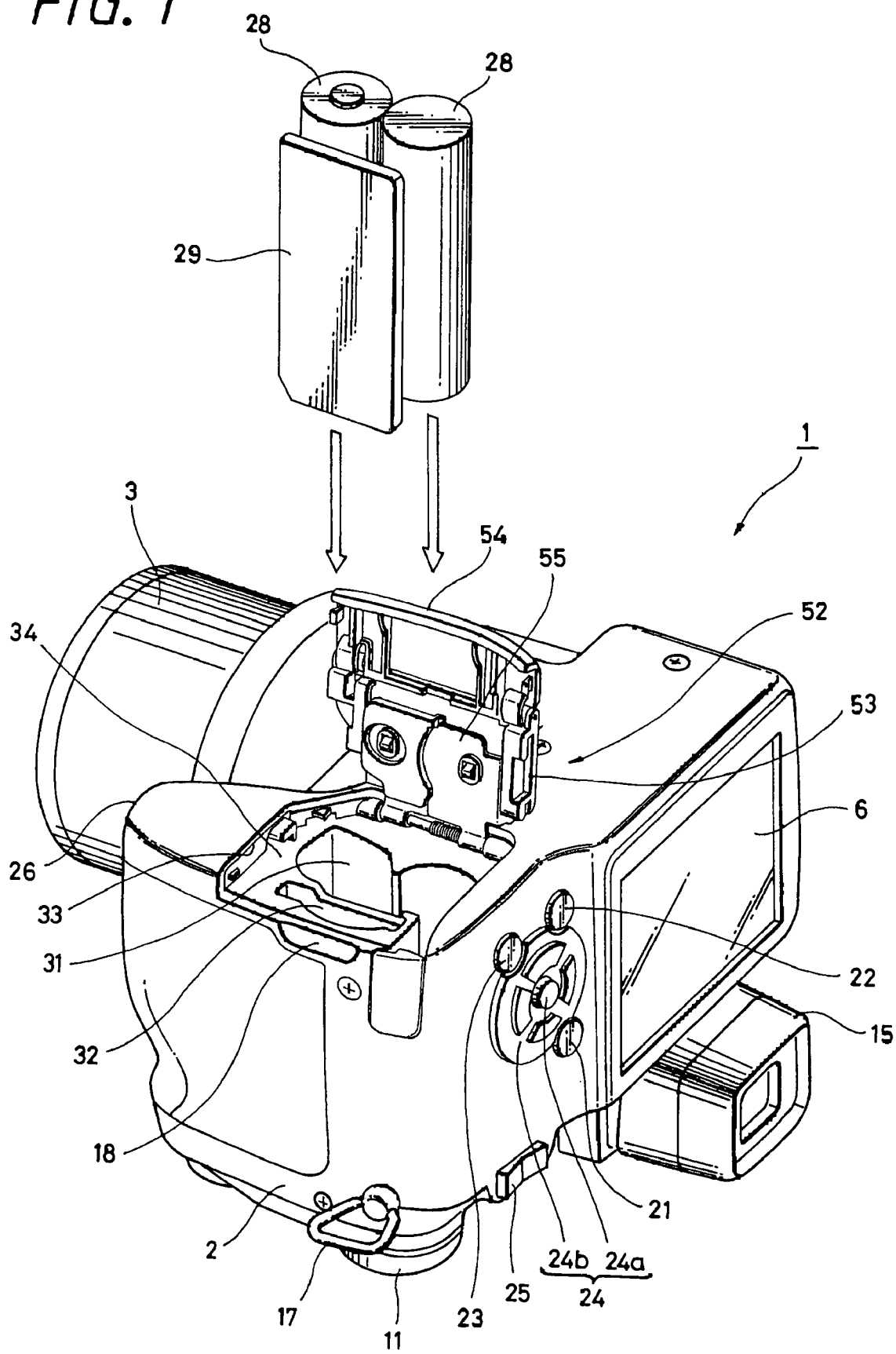
FIG. 1 is an external perspective view showing a digital still camera according to an embodiment of an electronic apparatus of the present invention, which is seen from the rear side of the digital still camera whose bottom surface faces upward.
Figure 2:
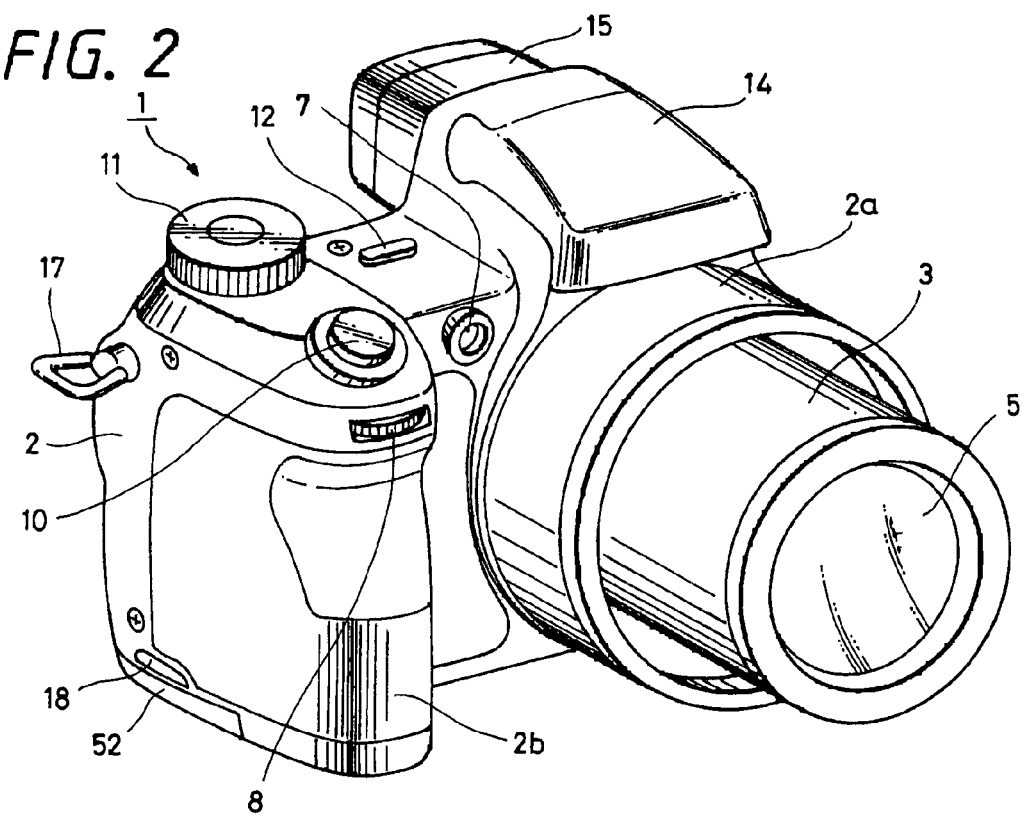
FIG. 2 is an external perspective view showing a digital still camera according to an embodiment of an electronic apparatus of the present invention, which is seen from the front side.
Figure 10:
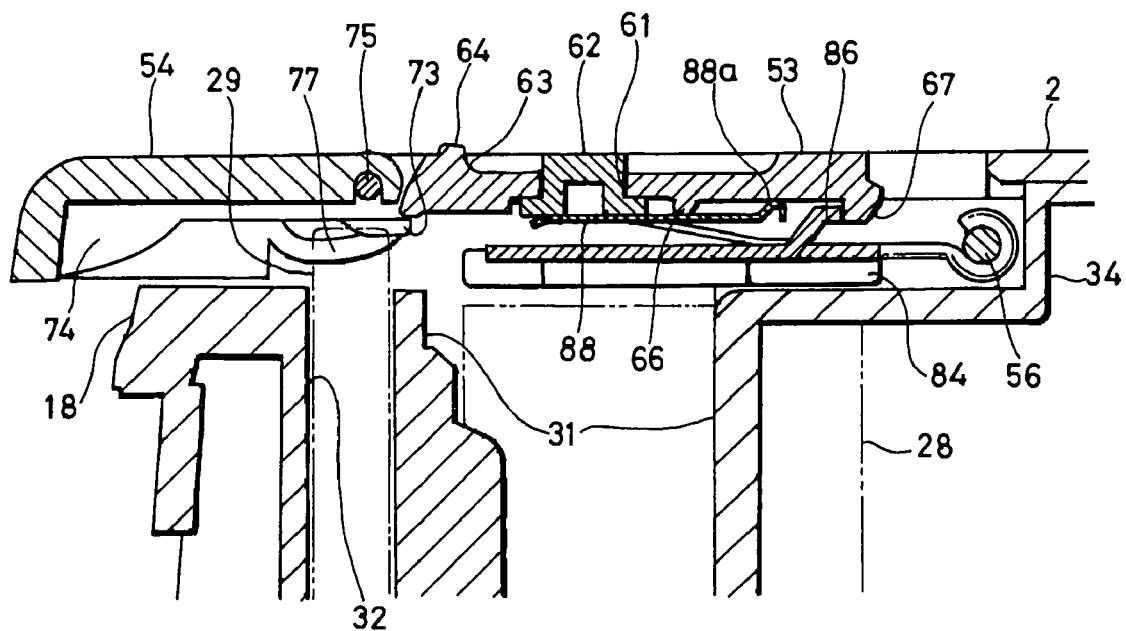
FIG. 10 is a sectional view showing a lid opening and closing device of the digital still camera shown in FIG. 1, in which a lid is slid.
Figure 11:
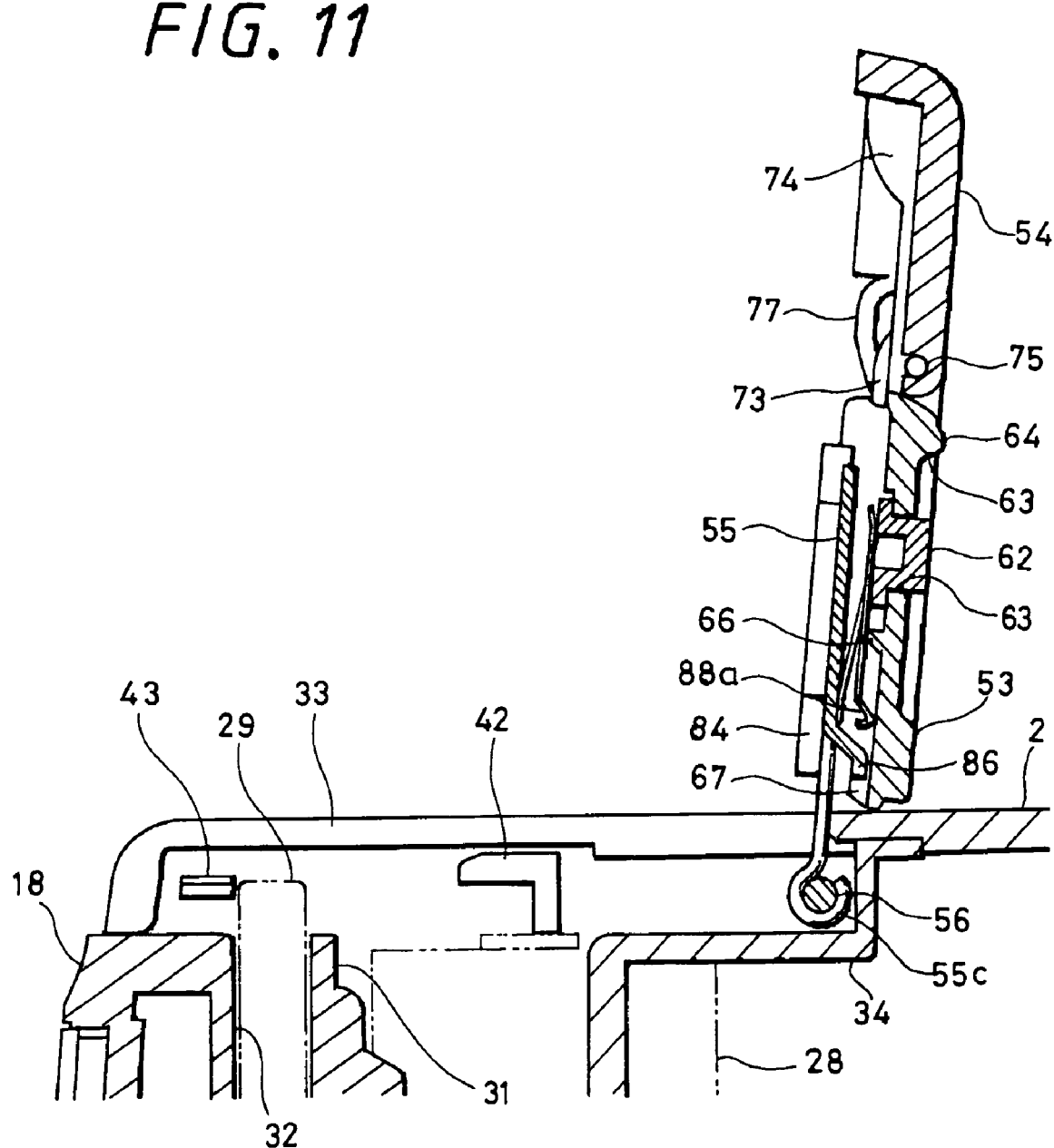
FIG. 11 is a sectional view showing a lid opening and closing device of the digital still camera shown in FIG. 1, in which a lid is opened to open a power source storing portion and an information storage medium storing portion.
Figure 12:
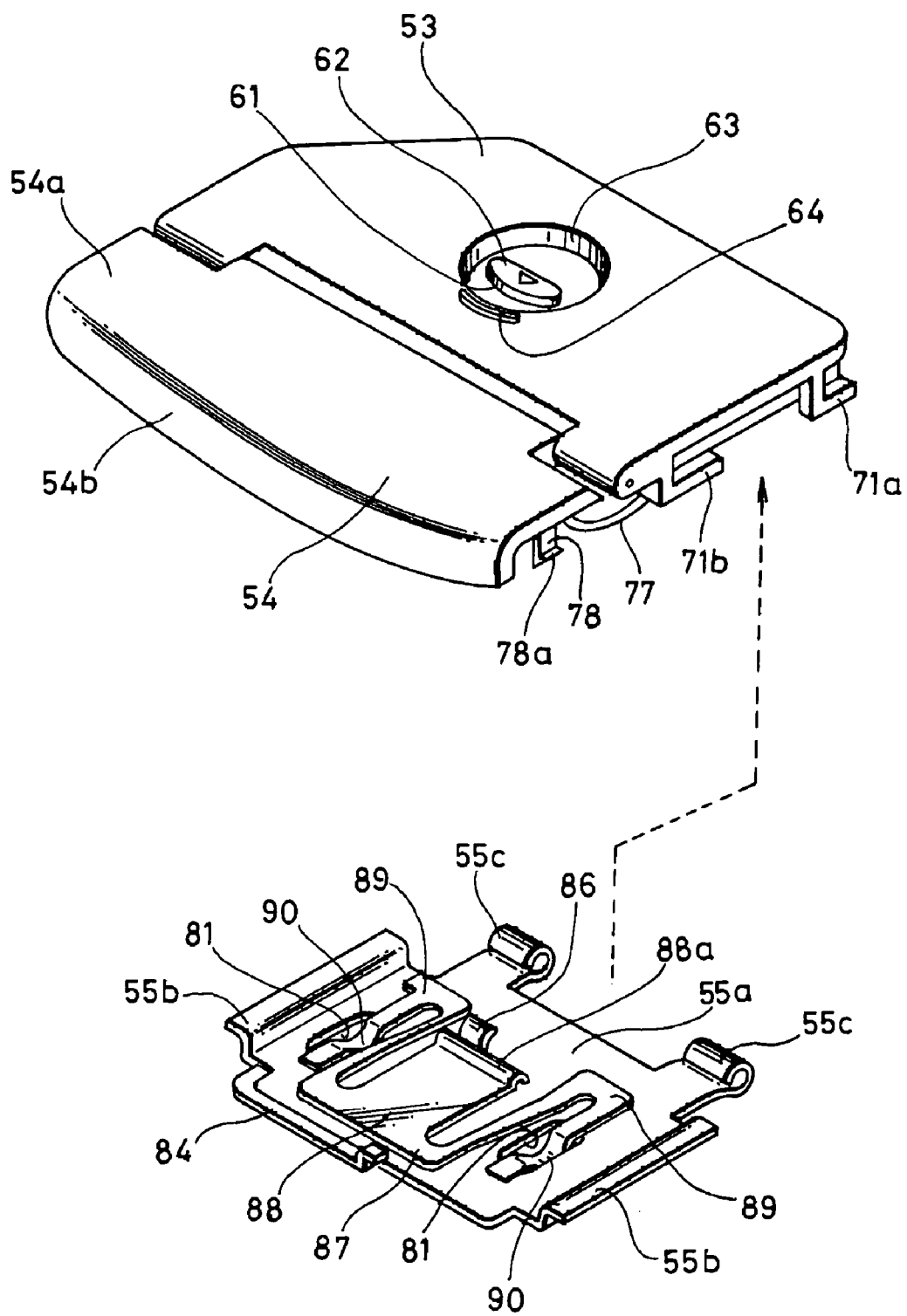
FIG. 12 is a perspective view in which a lid of a lid opening and closing device of the digital still camera shown in FIG. 1 is seen from outside in an exploded manner.
Figure 13:
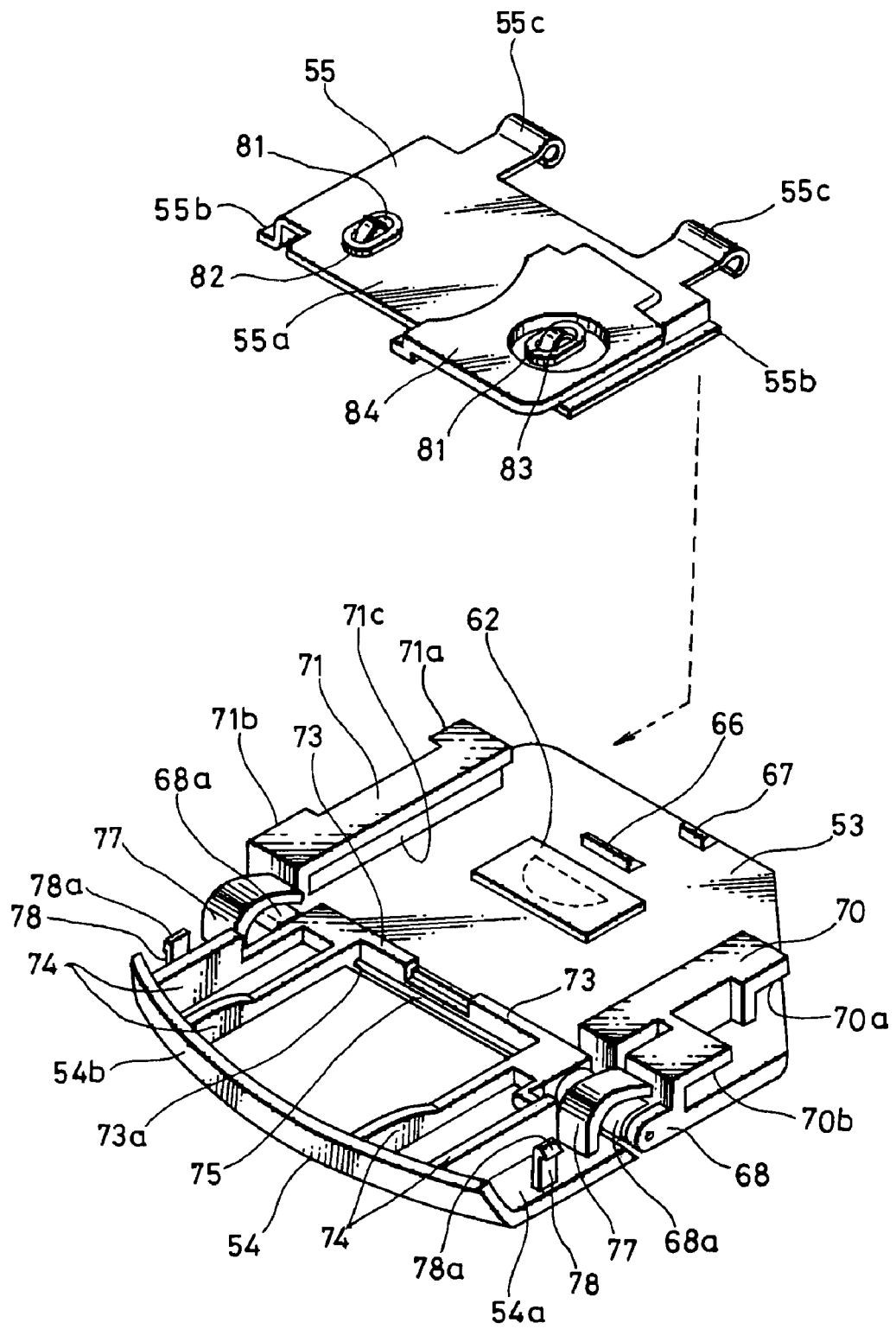
FIG. 13 is a perspective view in which a lid of a lid opening and closing device of the digital still camera shown in FIG. 1 is seen from inside in an exploded manner.
Figure 14A:
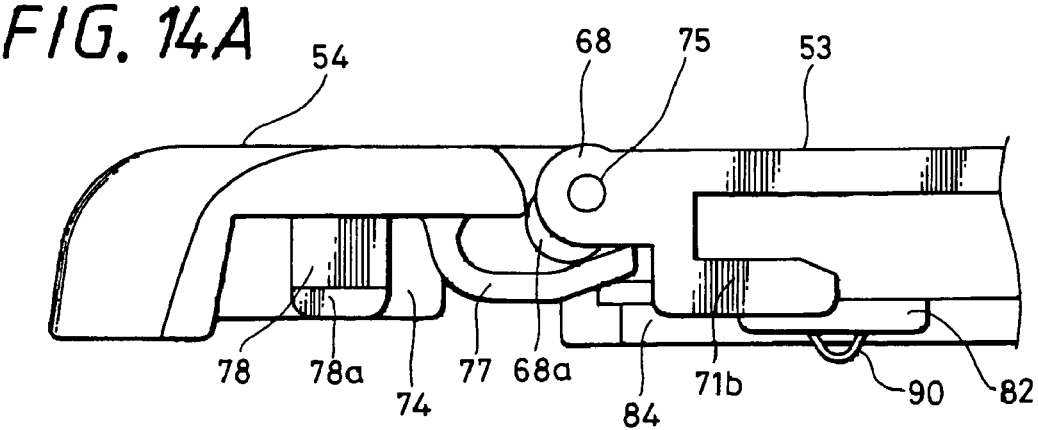
FIGS. 14A to 14C are explanatory views for explaining the motion of a second lid piece of a lid opening and closing device of the digital still camera shown in FIG. 1.
Figure 14B:
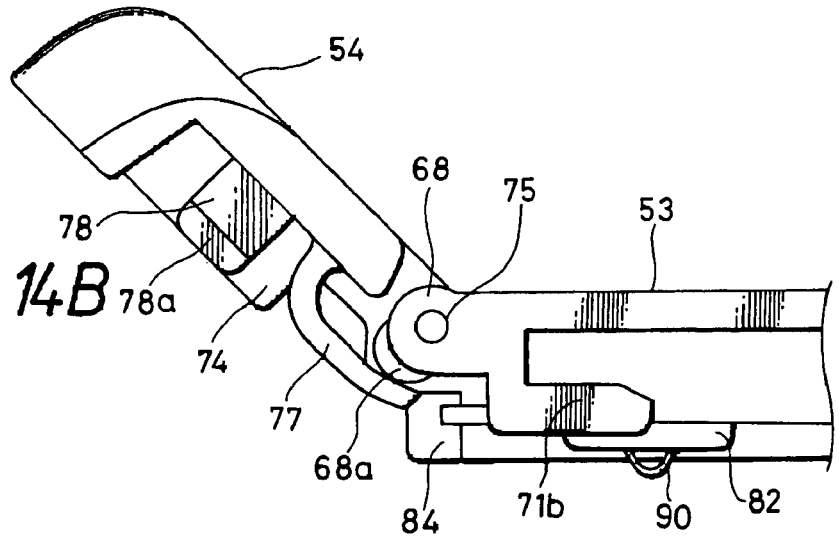
Figure 14C:
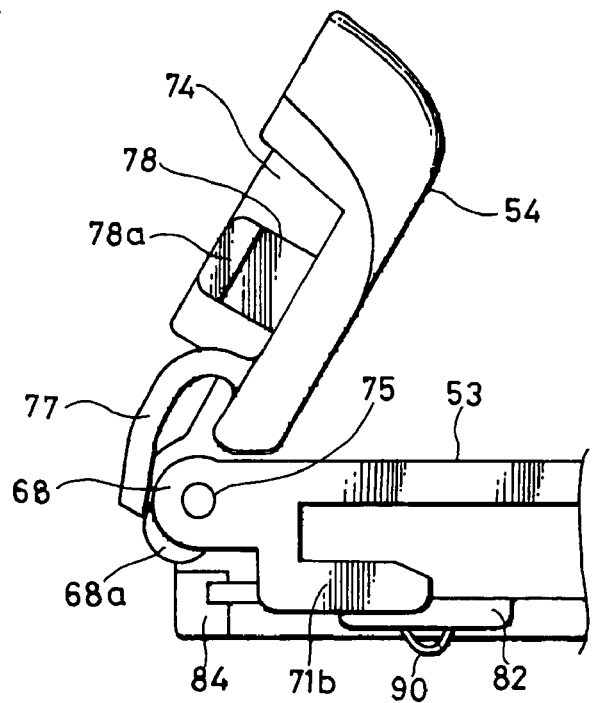
Figure 15:
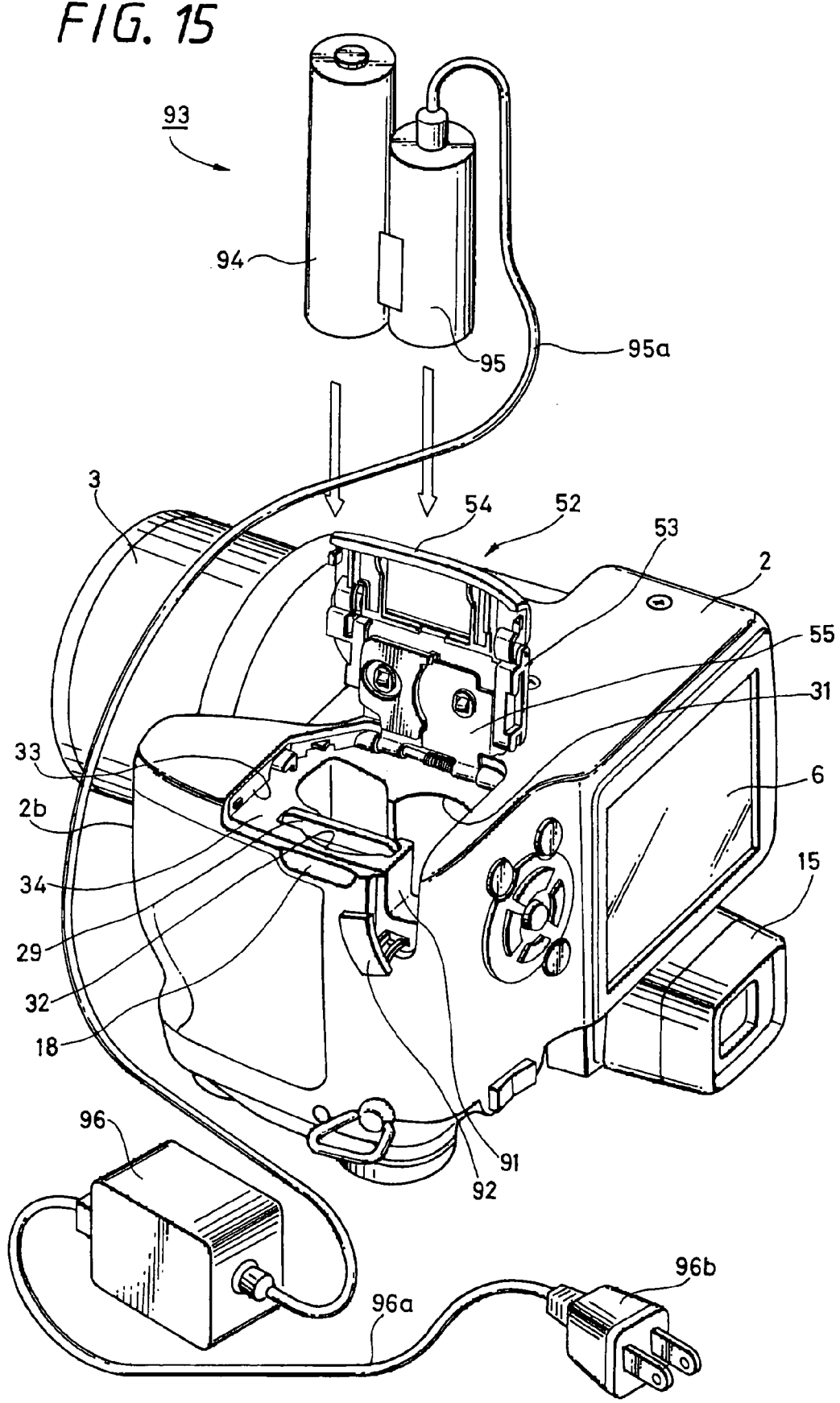
FIG. 15 is a perspective view showing a second embodiment of a power source used for a digital still camera of an electronic apparatus of the present invention.

FIGS. 1 to 15 show embodiments of the present invention. Specifically, FIGS. 1 and 2 show an imaging apparatus that is an embodiment of an electronic apparatus of the present invention: FIG. 1 is a perspective view seen from the bottom side; and FIG. 2 is a perspective view seen from the front side. FIGS. 3 to 11 show the relevant parts of the imaging apparatus shown in FIGS. 1 and 2: FIGS. 3 to 6 are explanatory views showing the operation of a lid which opens and closes a power source storing portion and an information storage medium storing portion; FIGS. 7 to 11 are sectional views thereof; FIG. 12 is a perspective view of the lid seen from the front side; FIG. 13 is a perspective view of the lid seen from the rear side; FIGS. 14A to 14C are explanatory views for explaining the operation of a second lid piece; and FIG. 15 is a perspective view showing a state in which a DC plate is inserted into the imaging apparatus shown in FIG. 1 seen from the rear side.

An imaging apparatus 1 shown in FIGS. 1 and 2 (hereinafter referred to as a digital still camera) uses a semiconductor storage medium as an information storage medium and is capable of converting an optical image into an electrical signal at a CCD (solid-state imaging device) to be recorded in the semiconductor storage medium and to be displayed on a display device such as a liquid crystal display. However, an information storage medium according to the present invention is not limited to a semiconductor storage medium, and needless to say a digital videocassette, an analog videocassette or other tape cassettes, using a tape-like storage medium, can be used, and a DVD (Digital Versatile Disc), a CD-ROM or other recordable disk-like storage media such as an optical disk, magneto-optical disk or magnetic disk can also be used.

As shown in FIGS. 1 and 2, the digital still camera 1 includes: a camera body 2 formed of a hollow casing; a lens device 3 which captures an object image as light to be led to a CCD serving as imaging means not shown in the figures; imaging means forming an image signal of the object based on light input from an image pickup lens 5 of the lens device 3; a liquid crystal display 6 which displays a picture based on an image signal formed by the imaging means or on information previously recorded in an information storage medium; and the like.

As shown in FIG. 2, the lens device 3 is installed in the camera body 2 at a position somewhat on the right side seen from the front, with the image pickup lens 5 exposed to the front. In order for this lens device 3 to be installed, a cylindrical lens protruding portion 2a which protrudes on the front side is provided on the camera body 2. Further, a self-timer lamp 7 is provided in the vicinity of the lens protruding portion 2a, at the approximate center of the camera body 2. Further, a grip portion 2b with which the camera body 2 can be gripped is provided on the left side of the camera body 2 as seen from the front. This grip portion 2b protrudes toward the front so as to be easily gripped, a manual setting dial 8 to alter set points such as the shutter speed, the stop, the exposure and the like is provided in the upper part thereof, and a shutter button 10 for photographing an object is provided in the vicinity of the manual setting dial 8.

On the top surface of the camera body 2 is provided a mode dial 11 in the vicinity of the shutter button 10. The mode dial 11 is to switch the function of the digital still camera 1 among the moving image photographing mode, the still image photographing mode, the image reproducing/editing mode and the like, for example. Further, on the opposite side to the mode dial 11 on the top surface of the camera body 2 are provided a flash device 14 and an electronic viewfinder 15. The flash device 14 and the electronic viewfinder 15 are provided such that the center thereof approximately corresponds with the center of the optical axis of the lens device 3. The flash device 14 rises when photographing is performed using a flash, and with this, a flash emitting portion not shown in the figures is exposed. Further, a power supply button 12, which is a switch to supply power, is provided between the mode dial 11 and the flash device 14.

A strap attachment portion 17 is provided at the upper part on the right side surface of the camera body 2. Although not shown in the figures, a wrist strap put around the wrist to hold the digital still camera 1 is attached to the strap attachment portion 17. Further, a lid concave portion 18 to open a lid 52 described later on by a finger or the like is provided at the lower part on the right side surface of the camera body 2.

As shown in FIG. 1, on the back surface of the camera body 2 are provided: a liquid crystal display 6; a screen display button 21 to control ON, OFF and the like of the liquid crystal display 6; a menu button 22; an image size/deletion button 23; a control button 24; a zoom button 25 to execute zoom operation; and the like.

On the back surface of the camera body 2, the liquid crystal display 6 is made large to occupy a large area from the middle to left part. The zoom button 25 is provided at the upper part on the right side of the liquid crystal display 6, and the control button 24 and other operational buttons are provided at the lower part thereof. With the zoom button 25, zoom operation can be executed at the time of reproduction, not to mention at the time of photographing.

The control button 24 is formed of a decision button 24a at the center and of four selection buttons 24b positioned above, below, on the left and right of the decision button 24a. The control button 24 selects a desired item or setting on a menu screen shown on the liquid crystal display 6 by means of the four selection buttons 24b, and then a decision is made by the decision button 24a, however, operation of the control button 24 is not limited thereto.

A tripod stand screw hole 27 (refer to FIG. 3, for example) is provided approximately at the center on the bottom surface of the camera body 2, and a power source storing portion 31 and an information storage medium storing portion 32 are provided on the grip portion 2b side. The power source storing portion 31 and the information storage medium storing portion 32 are formed in a housing 34 capable of being detached from the camera body 2. A semiconductor storage memory (for example, a Memory Stick™) 29 that is a specific example of an information storage medium is stored in the information storage medium storing portion 32, and two dry batteries 28 that is a specific example of power sources are stored in the power source storing portion 31. In this embodiment, a power source storing portion has such size to store two dry batteries of a portable power source, however, needless to say, a power source storing portion can be formed to store one dry battery or three or more dry batteries.

Although not shown in the figures, a contact point portion electrically connected to the terminals of the two dry batteries 28 and 28 stored, and an ejection spring to bias the two dry batteries 28 and 28 in the direction to be discharged from the power source storing portion 31 are provided at the bottom of the power source storing portion 31. Further, a push-push mechanism (mechanism with which operations are repeated only in the direction pushed) not shown in the figures, for holding the semiconductor storage memory 29 in a detachable manner is provided within the information storage medium storing portion 32. A lid concave portion 33 is provided around the power source storing portion 31 and the information storage medium storing portion 32, and the lid concave portion 33 is formed to be capable of being freely opened and closed by a lid 52.

Figure 6:
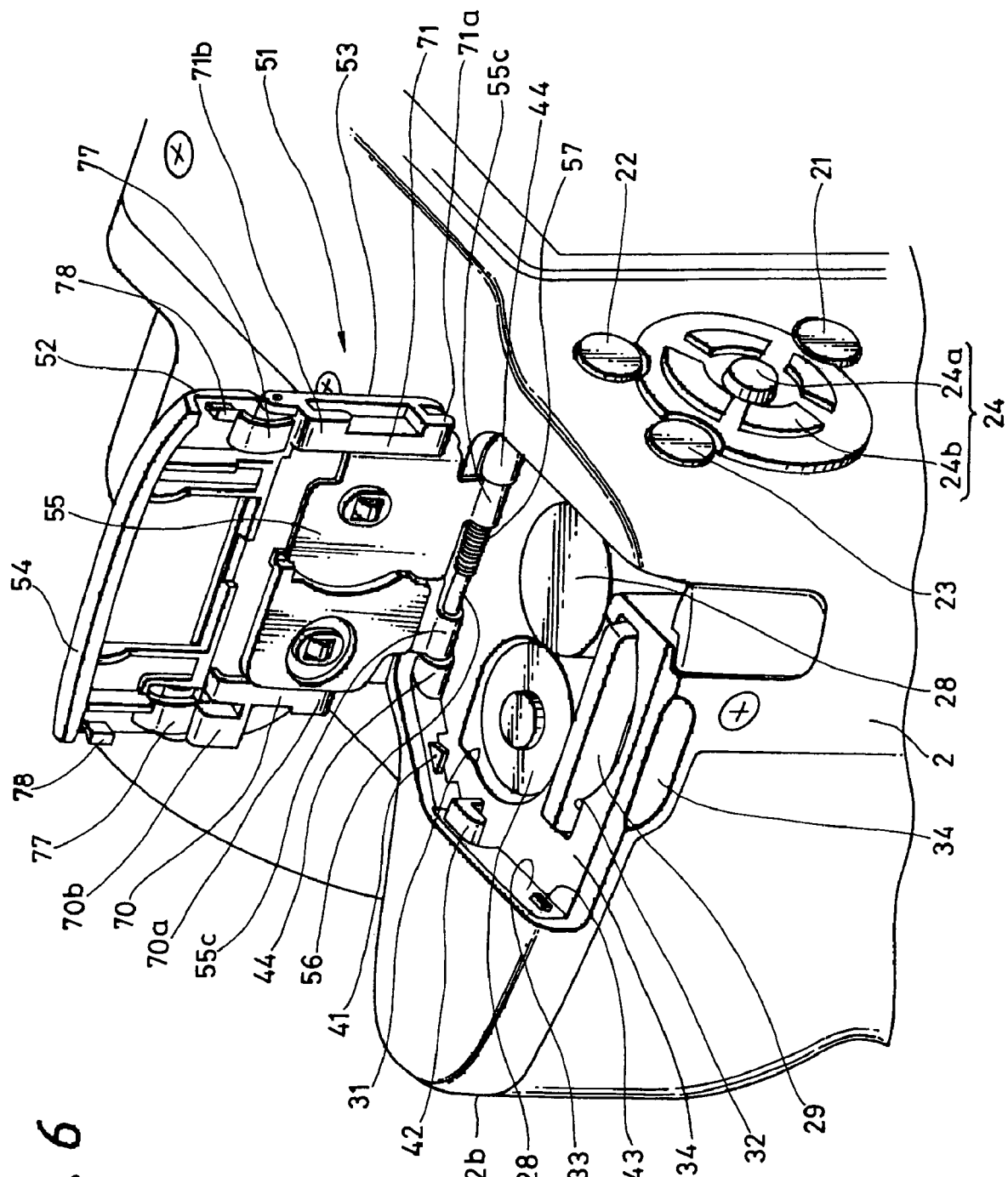
FIG. 6 is a perspective view showing a lid opening and closing device of the digital still camera shown in FIG. 1, in which a lid is opened to open a power source storing portion and an information storage medium storing portion.

As shown in FIG. 6 for example, the lid 52 is shaped to fit the lid concave portion 33 as a whole, and as a part of the camera body 2 forms the same plane surface together with the camera body 2 when the lid concave portion 33 is closed. The lid 52 includes a first lid piece 53, a second lid piece 54, a supporting plate 55 and the like, and there can be a state in which the lid 52 is opened to open the power source storing portion 31 and the information storage medium storing portion 32 together, and a state in which only the second lid piece 54 is opened to open the information storage medium storing portion 32 (refer to FIG. 4).

Figure 3:
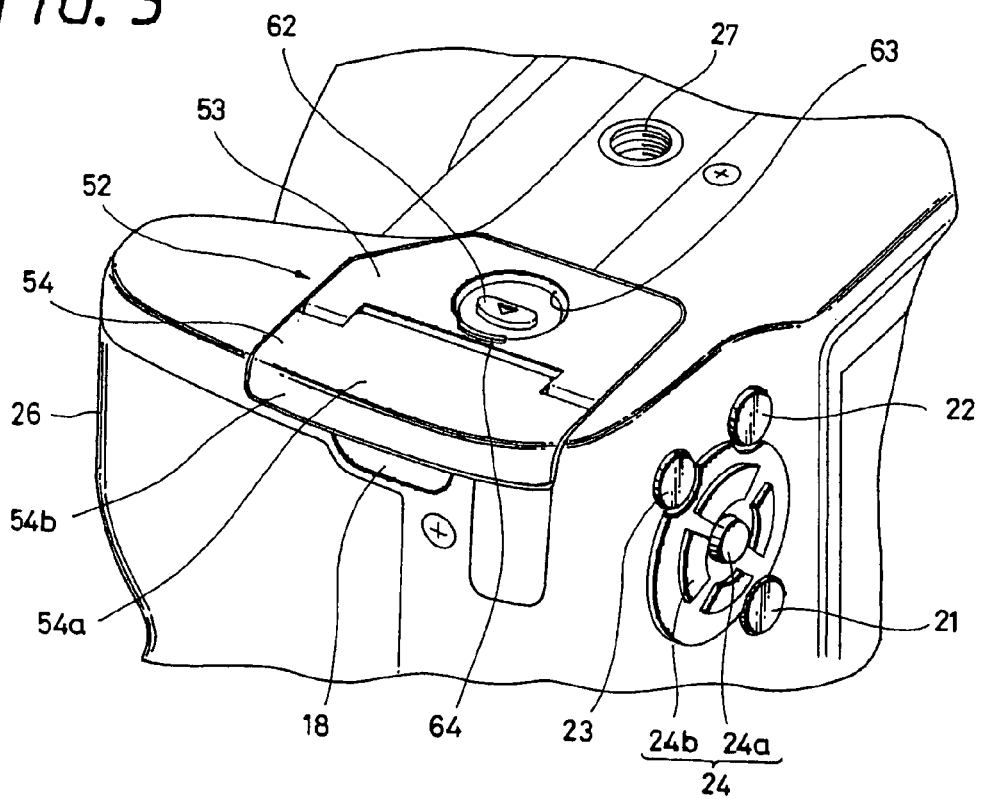
FIG. 3 is a perspective view showing a lid opening and closing device of the digital still camera shown in FIG. 1, in which a lid is closed.

As shown in FIGS. 3 and 12, the first lid piece 53 is made of a flat board approximately shaped like a quadrangle, and constitutes a part of the bottom surface of the camera body 2 in the state in which the lid concave portion 33 is closed. At approximately the center of the first lid piece 53, a through-hole 61 which passes through the front and back surfaces thereof is provided. The through-hole 61 is approximately shaped like a half moon, and an operational button concave portion 63 to make an operational button 62 protrude is provided around the through-hole 61 on the outer surface of the first lid piece 53. The operational button concave portion 63 has a circular shape for the operation with a fingertip, and a swell portion 64 for preventing slip is provided along part of the outer circumference thereof.

Further, as shown in FIG. 13, a lock protruding portion 66 is provided in the vicinity of the operational button 62 on the inner surface of the first lid piece 53. The lock protruding portion 66 has a thin shape extending in the longitudinal direction of the first lid piece 53 and has a slope on the opposite side to the operational button 62. A stopper protruding portion 67 is provided on a side of the first lid piece 53 on the slope side of the lock protruding portion 66, and a pair of bearing portions 68 and 68 is provided at both ends on another side (opposite side to the stopper protruding portion 67). The pair of bearing portions 68 and 68 has cam convex portions 68a and 68a forming cam surfaces having the shape of a high-order curve or parabola. The cam convex portions 68a and 68a are formed such that the arc-like portions protrude diagonally upward on the inner surface of the first lid piece 53.

Further, a first engagement portion 70 and a second engagement portion 71 which are engaged with the supporting plate 55 are provided at both ends in the width direction on the inner surface of the first lid piece 53. The first engagement portion 70 is approximately L-shaped when seen two-dimensionally, has an engagement groove not shown in the figures in the surface facing the second engagement portion 71, and has a first claw 70a and a second claw 70b having levels different from each other on the surface opposite to the engagement groove. These first and second claws 70a and 70b are engaged with engagement protruding portions 41 and 42 provided in the lid concave portion 33 respectively, when the first lid piece 53 is completely closed.

The second engagement portion 71 is approximately I-shaped, has an engagement groove 71c in the surface facing the first engagement portion 70, and has a first claw 71a and a second claw 71b (refer to FIG. 12) on the surface opposite to the engagement groove 71c. These first and second claws 71a and 71b are engaged with engagement protruding portions, not shown in the figures, provided in the lid concave portion 33, similarly to the first and second claws 70a and 70b of the first engagement portion 70.

As shown in FIGS. 4, 12 and other figures, the second lid piece 54 has a flat surface portion 54a to be a part of the bottom surface of the camera body 2 and a side surface portion 54b continuously formed into an upright position from one side of the flat surface portion 54a. The side surface portion 54b is bent to correspond to the curved surface on the right side surface of the camera body 2.

As shown in FIG. 13, a rotation prevention portion 73 is provided along the long side opposite to the side surface portion 54b on the inner surface of the flat surface portion 54a of the second lid piece 54. The rotation prevention portion 73 has two ends wider than the other parts, and shaft through-holes 73a and 73a through which a hinge shaft 75 is passed are provided at the two ends. Further, between the rotation prevention portion 73 and the side surface portion 54b are provided a plurality of (four in this embodiment) reinforcing beams 74 which are narrow and extend in the direction perpendicular to the axial direction of the hinge shaft 75.

Further, a pair of resilient locking pieces 77 and 77 is provided on the inner surface of the flat surface portion 54a of the second lid piece 54 at a predetermined interval from the rotation prevention portion 73. The pair of resilient locking pieces 77 and 77 is made of resilient pieces having appropriate curves (for example, parabolas, high-order curves or the like), and are engaged with the pair of cam convex portions 68a and 68a formed in the pair of bearing portions 68 and 68 of the first lid piece 53. Further, there is a locking piece 78 provided between the side surface portion 54b and each of the resilient locking pieces 77 and 77. Each locking piece 78 has a locking claw 78a at the tip and engages with a locking protruding portion 43 provided in the lid concave portion 33 when the second lid piece 54 is completely closed (refer to FIGS. 6 and 8).

The supporting plate 55 includes: a body portion 55a formed of an approximately quadrangular flat board; extending portions 55b and 55b continuously provided on both short sides of the body portion 55a; and a pair of bearing portions 55c and 55c continuing from a long side of the body portion 55a. The extending portions 55b and 55b of the supporting plate 55 are slidably engaged with the engagement groove 71c provided in the second engagement portion 71 of the first lid piece 53 and with an engagement groove provided in the first engagement portion 70 of the first lid piece 53, respectively.

Two through-holes 81 and 81 are provided at a predetermined interval in the longitudinal direction in the body portion 55a of the supporting plate 55. The two through-holes 81 and 81 are made of approximately elliptical long holes and, as shown in FIG. 13, edging portions 82 and 83 are provided around the through-holes 81 and 81 on the opposite surface to the surface facing the first lid piece 53. Further, an insulation cover 84 is attached around the edging portion 83 that is one of the above two edging portions.

As shown in FIG. 12, a stop protruding portion 86 is provided on the surface of the body portion 55a of the supporting plate 55, which faces the first lid piece 53. This stop protruding portion 86 faces the stopper protruding portion 67 of the first lid piece 53 when the supporting plate 55 is slidably supported by the first lid piece 53 (refer to FIG. 7). Further, a conductive circuit board 87 is provided to surround the stop protruding portion 86 on the surface of the body portion 55a, which faces the first lid piece 53.

The conductive circuit board 87 is made of an approximately M-shaped conductive member and includes: a body portion 88; a pair of fixed portions 89 and 89 continuous from both ends of the body portion 88; and a pair of contact terminal portions 90 and 90 continuous from the fixed portions 89 and 89. The body portion 88 is formed to be raised from the pair of fixed portions 89 and 89, and therefore a predetermined amount of space is set between the body portion 88 and the body portion 55a of the supporting plate 55. Further, a lock claw 88a bent in the direction opposite to the body portion 55a of the supporting plate 55 is provided at the tip of the body portion 88. Further, each of the contact terminal portions 90 is bent to the dogleg shape and passes through the through-hole 81. Thus, the pair of contact terminal portions 90 and 90 is in contact with the pair of dry batteries 28 and 28 respectively and the two dry batteries 28 and 28 are electrically connected in the state in which the first lid piece 53 is completely closed.

As the material for the first lid piece 53 and the second lid piece 54 described above, although ABS (acrylonitrile butadiene styrene resin) or other engineering plastics are suitable, aluminum alloy or other metals can also be used. Further, as the material for the supporting plate 55, although stainless alloy or other metals are suitable, engineering plastic having conductivity can also be used.

The lid 52 having the above-described structure can easily be assembled as follows, for example. First, as shown in FIG. 12 and other figures, the first lid piece 53 and the second lid piece 54 are combined by hinge means to be joined in a turnable manner. Specifically, the rotation prevention portion 73 of the second lid piece 54 is provided between the pair of bearing portions 68 and 68 of the first lid piece 53, and the hinge shaft 75 is passed through these holes. On this occasion, the pair of resilient locking pieces 77 and 77 formed on the second lid piece 54 is made to be engaged with the pair of cam convex portions 68a and 68a formed in the pair of bearing portions 68 and 68 of the first lid piece 53. Thus, regarding the second lid piece 54, there can be a flat state (FIG. 14A) in which the outer surface thereof forms one flat surface with the outer surface of the first lid piece 53, a folded state (FIG. 14C) in which the second lid piece 54 has been turned by approximately 120° with respect to the first lid piece 53, and a posture at any angle between those states.

Next, as shown in FIG. 13 and other figures, the operational button 62 is fitted into the through-hole 61 of the first lid piece 53 from the inner surface of the first lid piece 53. Subsequently, the first lid piece 53 into which the operational button 62 has been fitted is supported by the supporting plate 55 to which the insulation cover 84 and the conductive circuit board 87 have been attached in advance. Specifically, the pair of extending portions 55b and 55b of the supporting plate 55 is engaged with the engagement groove 71c provided in the second engagement portion 71 of the first lid piece 53 and with the engagement groove provided in the first engagement portion 70 of the first lid piece 53. Thus, the first lid piece 53 is slidably engaged with the supporting plate 55.

Next, as shown in FIG. 6 and other figures, with hinge means the supporting plate 55 is supported in a turnable manner by the housing 34 having the power source storing portion 31, the information storage medium storing portion 32 and the like. Specifically, the pair of bearing portions 55c and 55c of the supporting plate 55 is provided between a pair of bearing protruding portions 44 and 44 provided in the lid concave portion 33 of the housing 34, and a hinge shaft 56 is passed through these holes. On this occasion, a torsion coil spring 57 is installed between the pair of bearing portions 55c and 55c of the supporting plate 55, and two spring pieces, not shown in the figures, which are continuous to a coil portion of the torsion coil spring 57 are locked by spring bearing pieces provided on the supporting plate 55 and in the lid concave portion 33. As a result, the supporting plate 55 is biased by the spring force of the torsion coil spring 57 to be raised by approximately 90° from the lid concave portion 33. Thus, the lid 52 has been assembled. After that, the housing 34 with the lid 52 fitted is installed in an opening portion on the bottom surface of the camera body 2. Accordingly, the process of assembling the housing 34 into the camera body 2 has been completed.

According to the digital still camera 1 having the above structure, the lid 52 is opened and closed as follows, for example. Regarding the lid 52, two kinds of opening and closing operation are possible: opening and closing operation as a whole (the first lid piece 53 and the second lid piece 54), and opening and closing operation of only the second lid piece 54. As shown in FIG. 3, in the state in which the lid 52 is completely closed, the first and second claws 70a and 70b of the first engagement portion 70 provided on the first lid piece 53 are engaged with the engagement protruding portions 41 and 42 in the lid concave portion 33 respectively, and the first and second claws 71a and 71b of the second engagement portion 71 are engaged with the two engagement protruding portions in the lid concave portion 33, respectively. Accordingly, the first lid piece 53 cannot be opened.

Figure 7:
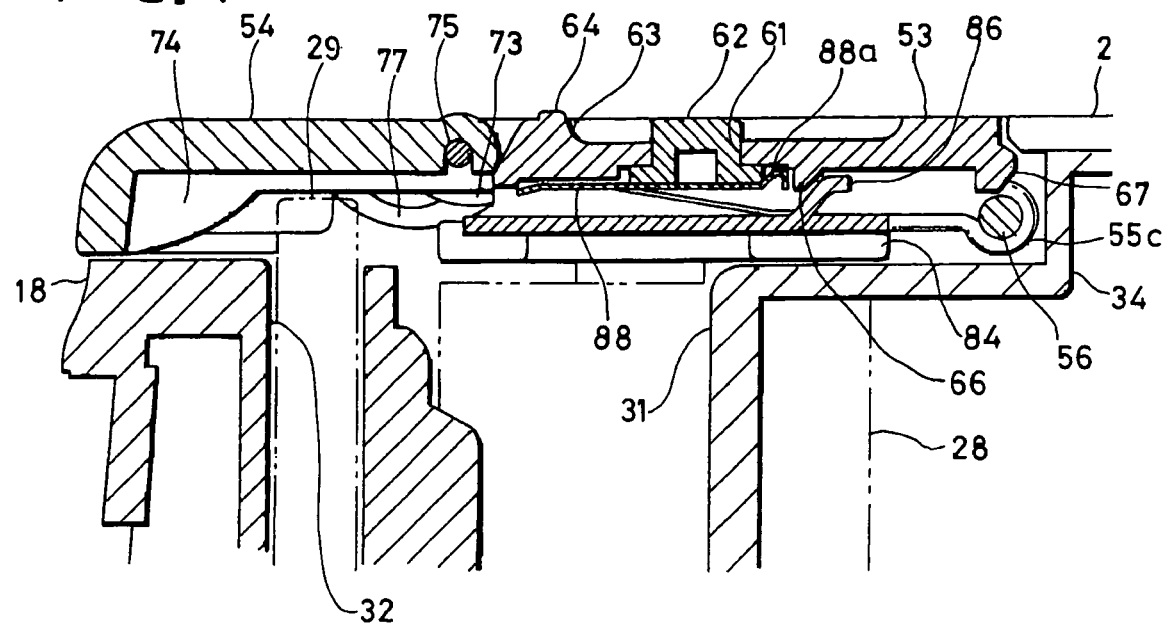
FIG. 7 is a sectional view showing a lid opening and closing device of the digital still camera shown in FIG. 1, in which a lid is closed.
Figure 8:
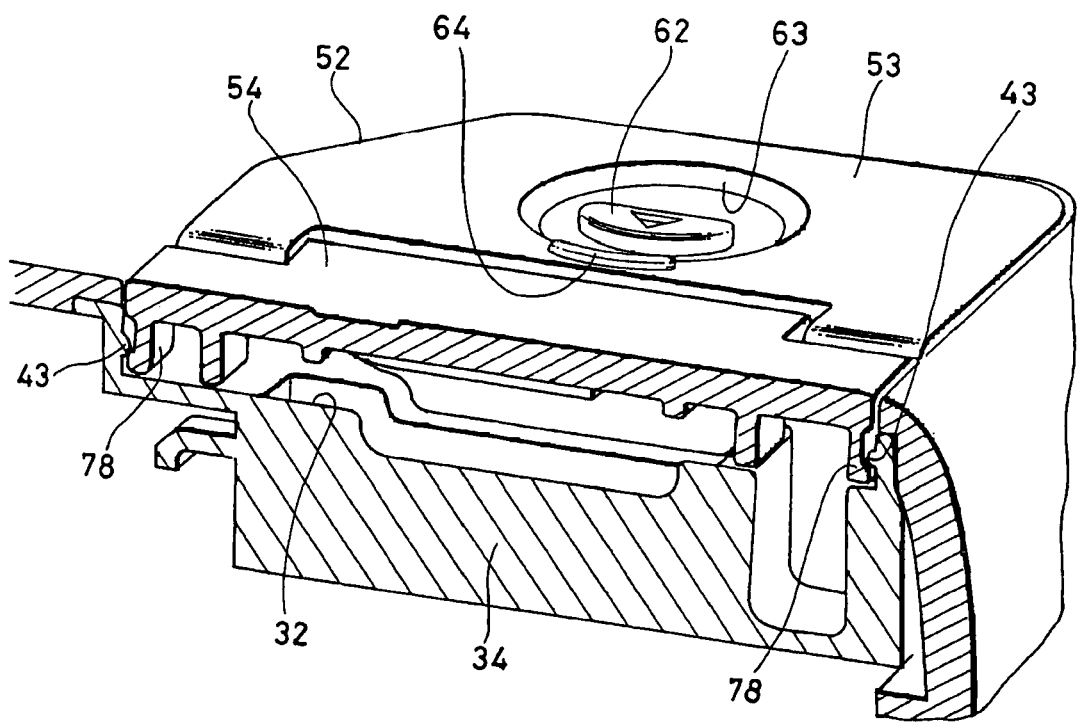
FIG. 8 is a sectional view showing a second lid piece of a lid opening and closing device of the digital still camera shown in FIG. 1, when a lid is closed.
Figure 9:
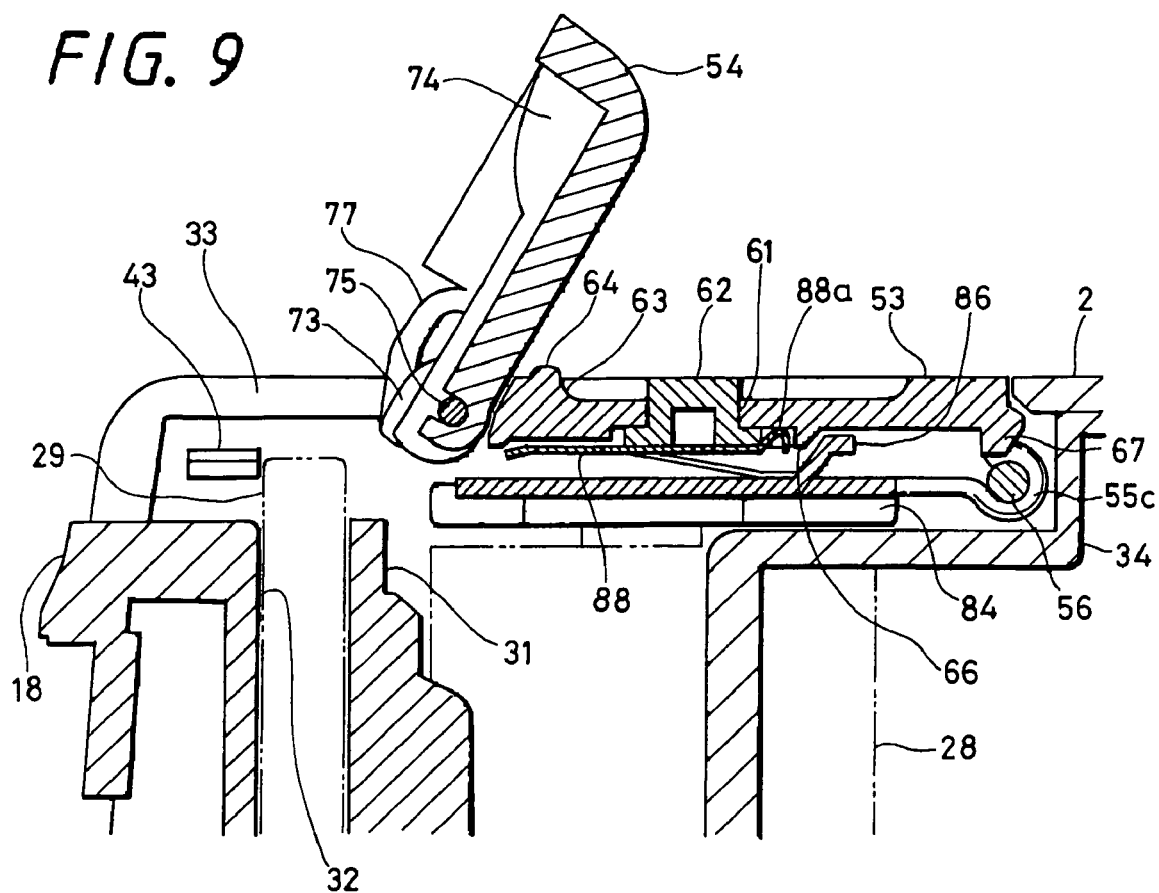
FIG. 9 is a sectional view showing a lid opening and closing device of the digital still camera shown in FIG. 1, in which a second lid piece is opened to open an information storage medium storing portion.

Further, as shown in FIG. 7, since the lock claw 88a of the conductive circuit board 87 attached to the supporting plate 55 and the lock protruding portion 66 of the first lid piece 53 interfere with each other, the first lid piece 53 cannot be slid outward, in other words, in the direction to be opened, and so the first lid piece 53 remains locked in the camera body 2. Further, the locking claws 78a and 78a of the pair of locking pieces 78 and 78 provided on the second lid piece 54 are kept locked by a pair of locking protruding portions 36 and 36 in the lid concave portion 33 (refer to FIG. 8). Thus, the second lid piece 54 closes the information storage medium storing portion 32.

First, the opening and closing operation of only the second lid piece 54 is explained. In order to open only the second lid piece 54 in the state of FIG. 3, a finger or the like is stuck in the lid concave portion 18 and forced in the direction in which the second lid piece 54 is opened. On this occasion, with the pair of locking pieces 78 and 78 on the second lid piece 54 bending inward, the locking claws 78a and 78a are detached from the locking protruding portions 36 and 36 in the lid concave portion 33 to open the second lid piece 54.

When the second lid piece 54 is in the state shown in FIG. 14A, the pair of resilient locking pieces 77 and 77 is engaged with the pair of cam convex portions 68a and 68a, and the rotation prevention portion 73 of the second lid piece 54 interferes with one side of the first lid piece 53, so that the rotation of the second lid piece 54 in the counterclockwise direction in the figure is restricted. Next, as shown in FIG. 14B, when turning the second lid piece 54, the curvature radius of the cam surfaces of the cam convex portions 68a and 68a are changed to make the frictional force of the resilient locking pieces 77 and 77 engaged with the cam convex portions 68a and 68a increase, and the frictional force and the turning force remain in equilibrium, so that a posture can be maintained at any angle. When the second lid piece 54 is further turned to reach the state shown in FIG. 14C, one side of the second lid piece 54 is in contact with one side of the first lid piece 53, so that the second lid piece 54 is prevented from being turned and remains open by approximately 120°. In this manner, regarding the second lid piece 54, the closed state of FIG. 14A and the open state of FIG. 14C can be selected, and further a posture at any angle between the two states can be selected.

Thus, when the second lid piece 54 is opened, the information storage medium storing portion 32 is opened, and the semiconductor storage memory 29 can be detached by pressing the push-push mechanism (operational mechanism in which actions are repeated only in the direction pushed) incorporated in the information storage medium storing portion 32. After that, when the second lid piece 54 is closed, the outer surface of the second lid piece 54 is pushed to move the second lid piece 54 in the direction to be closed, by pushing. On this occasion, the pair of locking pieces 78 and 78 on the second lid piece 54 is bent again, and the pair of locking claws 78a and 78a is locked by the pair of locking protruding portions 36 and 36 in the lid concave portion 33, thus, the second lid piece 54 becomes closed.

In this manner, by opening only the second lid piece 54 to open the information storage medium storing portion 32, the semiconductor storage memory 29 can be detached without opening the power source storing portion 31, in other words, without cutting power supplied to the digital still camera 1. Further, since the second lid piece 54 remains open by approximately 120° by means of the resilience of the pair of resilient locking pieces 77 and 77 which come into sliding contact with the pair of cam convex portions 68a and 68a, the semiconductor storage memory 29 can be pressed with ease.

Next, opening and closing operation of the whole of the lid 52 is explained. In order to open the lid 52 in the state shown in FIG. 3 in which the lid 52 is completely closed, first, the operational button 62 protruding in the operational button concave portion 63 provided in the lid 52 is pressed. On this occasion, as shown in FIG. 10, the body portion 88 of the conductive circuit board 87 attached to the supporting plate 55 is pushed down, enabling the lock protruding portion 66 of the first lid piece to move over the lock claw 88a provided at the tip of the body portion 88 of the conductive circuit board 87. Thus, sliding motion to make the lid 52 slide in a lateral direction of the camera body 2 is made possible.

Subsequently, as shown in FIG. 5, the lid 52 is slid in a lateral direction of the camera body 2 by a predetermined amount. Specifically, as shown in FIG. 10, the lid 52 is slid until the stopper protruding portion 67 of the first lid piece 53 is brought in contact with the stop protruding portion 86 of the supporting plate 55. On this occasion, since the ends of the pair of resilient locking pieces 77 and 77 of the second lid piece 54 are pressed to the base portion side of the pair of cam convex portions 68a and 68a of the first lid piece 53, the lid 52 is maintained in the flat state in which the outer surface of the second lid piece 54 and the outer surface of the first lid piece 53 constitute one flat surface.

When the lid 52 is slid in this manner, the first and second claws 70a and 70b of the engagement portion 70 and the first and second claws 71a and 71b of the engagement portion 71, which are provided on the first lid piece 53, are detached from the engagement protruding portions 41 and 42 and from the two engagement protruding portions not shown in the figures, which are provided in the lid concave portion 33, respectively. Concurrently, the pair of locking claws 78a and 78a of the pair of locking pieces 78 and 78 on the second lid piece 54 is detached from the pair of locking protruding portions 36 and 36 in the lid concave portion 33, and so the state in which the second lid piece 54 remains locked in the camera body 2 is released. As a result, turning motion of the lid 52 is made possible, and so the lid 52 is opened by means of the spring force of the torsion coil spring 57 in the state in which the first lid piece 53 has been slid with respect to the supporting plate 55 by a predetermined amount, as shown in FIGS. 6 and 11.

When the lid 52 is opened to open the power source storing portion 31, the two dry batteries 28 and 28 are pushed out by means of the biasing force of the ejection spring provided at the bottom of the power source storing portion 31, and those dry batteries 28 and 28 protrude from the power source storing portion 31 by a predetermined amount. In the state in which the lid 52 is open by approximately 90°, as shown in FIG. 11, one side of the first lid piece 53 of the lid 52 is in contact with the bottom surface of the camera body 2, so that the lid 52 is maintained standing approximately at right angles to the bottom surface of the camera body 2. Thus, the dry batteries 28 and 28 can be removed from the power source storing portion 31 with ease. Note that, in the state in which the lid 52 is open, the information storage medium storing portion 32 is also open, so that needless to say the semiconductor storage memory 29 can be detached.

Next, a case of closing the lid 52 is explained. In this case, the outer surface of the lid 52 is pushed in the lateral direction to turn the lid 52 by approximately 90°. Thus, being shifted in a lateral direction of the camera body 2 by a predetermined amount, the lid 52 covers the lid concave portion 33. Subsequently, the lid 52 is slid toward the inside of the camera body 2. Thus, the first and second claws 70a and 70b of the engagement portion 70 and the first and second claws 71a and 71b of the engagement portion 71, which are provided on the first lid piece 53, are engaged with the engagement protruding portions 41 and 42 and with the two engagement protruding portions not shown in the figures, which are provided in the lid concave portion 33, respectively. Concurrently, the locking claws 78a and 78a of the pair of locking pieces 78 and 78 on the second lid piece 54 are engaged with the pair of locking protruding portions 43 and 43 in the lid concave portion 33, and so the second lid piece 54 remains closed with respect to the camera body 2. Further, when the lock protruding portion 66 of the first lid piece 53 has slid on the body portion 88 of the conductive circuit board 87 and then moved over the lock claw 88a, the first lid piece 53 is locked in the camera body 2, making the lid 52 closed, and both the power source storing portion 31 and the information storage medium storing portion 32 are closed by the lid 52.

FIG. 15 shows a second embodiment of a power source stored in a power source storing portion, in which a DC plate 93 is used. The DC plate 93 includes a power source body 94, a connecting portion 95 and an AC/DC converter 96. The power source body 94 is shaped like a dry battery and is integrated with the connecting portion 95. A cord 95a is led out from the connecting portion 95, and the cord 95a is connected to one end of the AC/DC converter 96. To the other end of the AC/DC converter 96 is connected a cord 96a, and at the end of the cord 96a is provided an AC plug 96b. When the DC plate 93 is used, alternating current supplied through the AC plug 96b connected to a domestic power source or the like is converted to direct current in the AC/DC converter 96, and the direct current power is supplied from the power source body 94 to a digital camera 1 through the connecting portion 95.

A cord-passing groove 91 is provided in a camera body 2 having a power source storing portion 31 where the DC plate 93 is stored. The cord-passing groove 91 is continuous with one corner of the power source storing portion 31, passes outside the information storage medium storing portion 32, and is opened in the right side surface of the camera body 2. The cord-passing groove 91 is freely opened and closed with a groove lid 92. The cord 95a of the DC plate 93 is inserted and passed in the cord-passing groove 91, the power source body 94 connected to one end thereof is stored in the power source storing portion 31, and the other end is led out of the camera body 2.

With the above cord-passing groove 91 being provided, the cord 95a of the DC plate 93 can be led out of the digital still camera 1 through the cord-passing groove 91, and so alternating current can be obtained from a domestic power source or the like to be supplied to the digital still camera 1 as a power source, in the state in which the DC plate 93 is stored and a lid concave portion 33 is closed with a lid 52. Further, since the supplied power can be made considerably large in comparison with the power source such as a dry battery, the digital still camera 1 can be used continuously for a long period of time.

As explained above, according to embodiments of the present invention, since the above-described structure is provided, a state in which the whole lid is opened to open a power source storing portion and an information storage medium storing portion and a state in which only a second lid piece is opened to open only an information storage medium storing portion can be obtained. Therefore, an information storage medium can be detached with a power source storing portion being closed, in other words, without cutting the power to an electronic apparatus, and so there is no need to restart the electronic apparatus every time the information storage medium is detached, which enables operability to be improved. Further, since the power is not cut if an information recording medium storing portion is opened by mistake while the communication apparatus is communicating with an information recording medium, loss of recording data can be prevented.

The present invention is not limited to the embodiments described above and shown in the figures, and a variety of modified embodiments can be employed without departing from the gist thereof. For example, although examples in which a digital still camera is used as an electronic apparatus have been explained in the above described embodiments, the present invention can be applied to personal computers, portable game equipment and various other electronic apparatuses, not to mention to digital video camera recorders, mobile phones having a camera function, PHS phones having a camera function and other imaging apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
   an electronic apparatus body including a power source storage portion configured to store a power source in a detachable manner, and an information storage medium storage portion configured to store an information storage medium in a detachable manner; and
   a lid that is rotatably attached to said electronic apparatus body at a first hinge such that the lid is rotatable relative to the said electronic apparatus body about a longitudinal axis of said first hinge from an open position in which both of said power source storage portion and said information storage medium storage portion are accessible to a closed position in which the lid prevents access to said power source storage portion and said information storage medium storage portion, said lid including
      a first lid piece that faces said power source storage portion when the lid is in the closed position, said first lid piece being slidably and rotatably attached to said electronic apparatus body such that said first lid piece is configured to slide relative to said electronic apparatus body in a direction substantially perpendicular to the longitudinal axis of said first hinge and such said first lid piece is configured to rotate relative to said electronic apparatus body about the longitudinal axis of said first hinge,
      a second lid piece that faces said information storage medium portion when the lid is in the closed position, said second lid piece being rotatably attached to said first lid piece by a second hinge, and
      a lock mechanism configured to lock said first lid piece to said electronic apparatus body.

2. An electronic apparatus according to claim 1,
   wherein said power source storage portion is configured to store a plurality of battery power sources, and
   wherein said first lid piece includes a conductive material that is configured to make an electrical connection between said electronic apparatus body and said plurality of battery power sources.

3. An electronic apparatus according to claim 1, wherein said electronic apparatus body includes a cord-passing groove that passes from an interior of said information storage medium storage portion to an exterior of said information storage medium storage portion such that a first end of the cord-passing groove opens to said power source storage portion and a second end of the cord passing groove opens on an outer surface of said electronic apparatus body.

4. An electronic apparatus according to claim 1, wherein one of said first lid piece and said second lid piece includes a cam convex portion that includes a surface having a shape defined by a parabola or high-order curve, and the other one of said first lid piece and said second lid piece includes a resilient locking piece that is biased by said cam convex portion.

5. An electronic apparatus according to claim 1, wherein the second lid piece is rotatably attached to said first lid piece by the second hinge such that the second lid piece is rotatable relative to the first lid piece from a flat state in which an outer surface of the second lid piece forms a single flat surface with an outer surface of the first lid piece to a folded state in which the outer surface of the second lid piece forms a angle greater than zero degrees with the outer surface of the first lid piece.

6. An electronic apparatus according to claim 5, wherein the second lid piece is attached to said first lid piece such that said the lid is configured to rotate relative to the said electronic apparatus body from the open position to the closed position in the flat state.

7. An electronic apparatus according to claim 1, wherein the second lid piece is rotatably attached to said first lid piece by the second hinge so as to be selectively openable such that the second lid piece is rotatable relative to the electronic apparatus body while the first lid piece remains stationary relative to the electronic apparatus body.

8. An electronic apparatus according to claim 7, wherein the first lid piece is attached to the second lid piece and the electronic apparatus body such that the first lid piece is not selectively openable such that the second lid piece slides or rotates together with the first lid piece when the first lid piece slides or rotates relative to the electronic apparatus body.

9. An electronic apparatus comprising:
   an electronic apparatus body including a power source storage portion configured to store a power source in a detachable manner, and an information storage medium storage portion configured to store an information storage medium in a detachable manner; and
   a lid that is rotatably attached to said electronic apparatus body at a first hinge such that the lid is rotatable relative to the said electronic apparatus body about a longitudinal axis of said first hinge from an open position in which both of said power source storage portion and said information storage medium storage portion are accessible to a closed position in which the lid prevents access to said power source storage portion and said information storage medium storage portion, said lid including
      a first lid piece that faces said power source storage portion when the lid is in the closed position, said first lid piece being slidably and rotatably attached to said electronic apparatus body such that said first lid piece is configured to slide relative to said electronic apparatus body in a direction substantially perpendicular to the longitudinal axis of said first hinge and such said first lid piece is configured to rotate relative to said electronic apparatus body about the longitudinal axis of said first hinge,
      a second lid piece that faces said information storage medium portion when the lid is in the closed position, said second lid piece being rotatably attached to said first lid piece by a second hinge, and
      means for locking said first lid piece to said electronic apparatus body.

10. An electronic apparatus according to claim 9,
wherein said power source storage portion is configured to store a plurality of battery power sources, and
wherein said first lid piece includes a conductive material that is configured to make an electrical connection between said electronic apparatus body and said plurality of battery power sources.

11. An electronic apparatus according to claim 9, wherein said electronic apparatus body includes a cord-passing groove that passes from an interior of said information storage medium storage portion to an exterior of said information storage medium storage portion such that a first end of the cord-passing groove opens to said power source storage portion and a second end of the cord passing groove opens on an outer surface of said electronic apparatus body.

12. An electronic apparatus according to claim 9, wherein one of said first lid piece and said second lid piece includes a cam convex portion that includes a surface having a shape defined by a parabola or high-order curve, and the other one of said first lid piece and said second lid piece includes a resilient locking piece that is biased by said cam convex portion.

13. An electronic apparatus according to claim 9, wherein the second lid piece is rotatably attached to said first lid piece by the second hinge such that the second lid piece is rotatable relative to the first lid piece from a flat state in which an outer surface of the second lid piece forms a single flat surface with an outer surface of the first lid piece to a folded state in which the outer surface of the second lid piece forms a angle greater than zero degrees with the outer surface of the first lid piece.

14. An electronic apparatus according to claim 13, wherein the second lid piece is attached to said first lid piece such that said the lid is configured to rotate relative to the said electronic apparatus body from the open position to the closed position in the flat state.

15. An electronic apparatus according to claim 9, wherein the second lid piece is rotatably attached to said first lid piece by the second hinge so as to be selectively openable such that the second lid piece is rotatable relative to the electronic apparatus body while the first lid piece remains stationary relative to the electronic apparatus body.

16. An electronic apparatus according to claim 15, wherein the first lid piece is attached to the second lid piece and the electronic apparatus body such that the first lid piece is not selectively openable such that the second lid piece slides or rotates together with the first lid piece when the first lid piece slides or rotates relative to the electronic apparatus body.

* * * * *